(12) United States Patent
Troy et al.

(10) Patent No.: US 10,289,263 B2
(45) Date of Patent: May 14, 2019

(54) DATA ACQUISITION AND ENCODING PROCESS LINKING PHYSICAL OBJECTS WITH VIRTUAL DATA FOR MANUFACTURING, INSPECTION, MAINTENANCE AND REPAIR

(71) Applicant: THE BOEING COMPANY, Chicago, IL (US)

(72) Inventors: James J. Troy, Issaquah, WA (US); Kevin Puterbaugh, Auburn, WA (US); William E. Ward, Bellevue, WA (US); John C. Gass, Sammamish, WA (US); Michael P. Sciarra, Seattle, WA (US); Katherine I. Meza, Lynnwood, WA (US); Steven E. Malarkey, Lynnwood, WA (US); Nikoli E. Prazak, Renton, WA (US); William J. McGarry, Federal Way, WA (US); William J. Brown, Seattle, WA (US); Jeffery A. Bus, Bothell, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 15/178,922

(22) Filed: Jun. 10, 2016

(65) Prior Publication Data

US 2017/0199645 A1 Jul. 13, 2017

Related U.S. Application Data

(60) Provisional application No. 62/276,466, filed on Jan. 8, 2016.

(51) Int. Cl.
*G06F 3/0481* (2013.01)
*G06F 3/0484* (2013.01)
(Continued)

(52) U.S. Cl.
CPC ...... *G06F 3/04815* (2013.01); *G06F 3/04847* (2013.01); *G06Q 10/087* (2013.01); *G07C 5/00* (2013.01)

(58) Field of Classification Search
CPC .................. G06F 3/04815; G06F 3/04847
See application file for complete search history.

(56) References Cited

U.S. PATENT DOCUMENTS 9,117,039 B1 * 8/2015 Mosterman ......... G06F 17/5009
9,665,960 B1 * 5/2017 Masters .................. G06T 11/60
(Continued)

*Primary Examiner* — Shourjo Dasgupta
(74) *Attorney, Agent, or Firm* — Womble Bond Dickinson (US) LLP

(57) ABSTRACT

A method is provided that includes rendering for display, a digital three-dimensional (3D) model of a structural product composed of a plurality of parts, with the digital 3D model being observed from a home viewpoint. Input is received to navigate the digital 3D model to a part of the plurality of parts, observation of the digital 3D model being moved from the home viewpoint to a navigated viewpoint. A digital label is generated that includes information specifying the navigated viewpoint and includes information for the part. The digital label may be output to a label recorder configured to record the digital label on a physical medium and thereby produce a corresponding physical label. At least the navigated viewpoint of the digital 3D model in the digital label and corresponding physical label are in a machine-readable format and capable of being machine-read to automatically restore the digital 3D model at the navigated viewpoint.

18 Claims, 11 Drawing Sheets

(51) Int. Cl.
*G06Q 10/08* (2012.01)
*G07C 5/00* (2006.01)

(56) References Cited

U.S. PATENT DOCUMENTS

| | | | | |
|---|---|---|---|---|
| 9,740,895 B1* | 8/2017 | Liu | ............... | G06Q 10/00 |
| 2008/0222184 A1* | 9/2008 | Wang | ............... | G06Q 10/06 |
| 2009/0067910 A1* | 3/2009 | Sugiyama | ............... | B41J 3/4075 |
| | | | | 400/76 |
| 2009/0106037 A1* | 4/2009 | Harindranath | ......... | G06Q 30/06 |
| | | | | 705/342 |
| 2012/0274970 A1* | 11/2012 | Cok | ............... | H04N 1/32128 |
| | | | | 358/1.14 |
| 2013/0162676 A1* | 6/2013 | Taylor | ............... | G06T 7/004 |
| | | | | 345/633 |
| 2014/0022281 A1* | 1/2014 | Georgeson | ............ | G06F 3/1454 |
| | | | | 345/633 |
| 2014/0100994 A1* | 4/2014 | Tatzel | ............... | G06Q 30/0268 |
| | | | | 705/27.1 |
| 2014/0100995 A1* | 4/2014 | Koshy | ............... | G06Q 30/0643 |
| | | | | 705/27.2 |
| 2014/0100996 A1* | 4/2014 | Klein | ............... | G06Q 30/0643 |
| | | | | 705/27.2 |
| 2014/0100997 A1* | 4/2014 | Mayerle | ............ | G06Q 30/0643 |
| | | | | 705/27.2 |
| 2015/0012566 A1* | 1/2015 | Cartwright | ........... | G06Q 10/087 |
| | | | | 707/805 |
| 2015/0169190 A1* | 6/2015 | Girardeau | ........... | G06F 3/04842 |
| | | | | 715/771 |

* cited by examiner

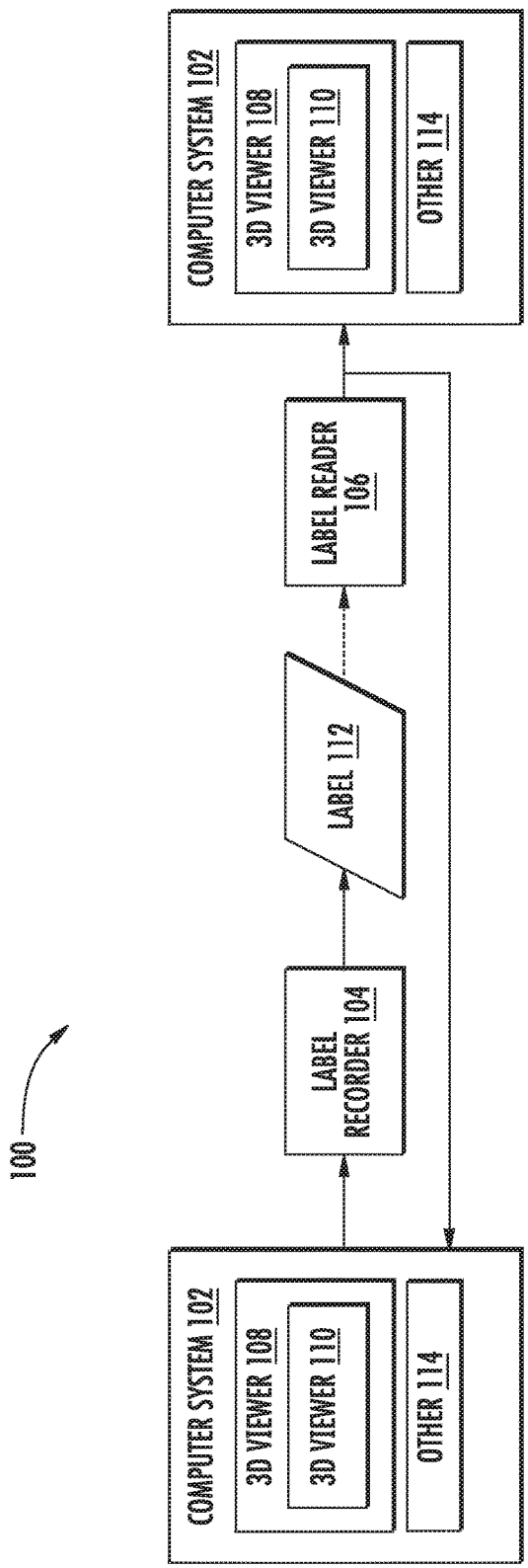

FIELD REPAIR REMOVAL RECORD

| MODEL NUMBER | REGISTRY NUMBER | VARIABLE NUMBER | SERIAL NUMBER | RECORD NUMBER 1-1 |

| PART NUMBER, DESCRIPTION AND LOCATION OF REMOVAL | REASON FOR REMOVAL | ADDITIONAL INFORMATION |

1. 012A3456-789#A AIRCRAFT PART
STA (x): 012
BL(y): 34
WL(z): 567

| OKAY TO REMOVE | OKAY TO INSTALL-FOD FREE | SERIAL NUMBER REMOVED | REINSTALLED | SERIAL NUMBER INSTALLED | RETEST |
| MECH / INSP | MECH / INSP | | MECH / INSP | | MECH / INSP |
| DATE / DATE | DATE / DATE | | DATE / DATE | | DATE / DATE |

 
FIG. 9B

DATA ACQUISITION AND ENCODING PROCESS LINKING PHYSICAL OBJECTS WITH VIRTUAL DATA FOR MANUFACTURING, INSPECTION, MAINTENANCE AND REPAIR

CROSS-REFERENCE TO RELATED APPLICATION(S)

The present application claims priority to U.S. Provisional Patent Application No. 62/276,466, entitled: Data Acquisition and Encoding Process Linking Physical Objects with Virtual Data for Manufacturing, Inspection, Maintenance and Repair, filed on Jan. 8, 2016, the content of which is incorporated herein by reference in its entirety.

TECHNOLOGICAL FIELD

The present disclosure relates generally to manufacturing, inspection, maintenance and repair of a structural product and, in particular, to a data acquisition and encoding process linking physical objects with virtual data for manufacturing, inspection, maintenance and repair.

BACKGROUND

Many modern manufactured systems and other structural products such as aircraft have extensive maintenance requirements and data records. Current maintenance data systems allow technicians to retrieve technical manuals and other maintenance information for a system type being worked on in portable computer or handheld computing devices for ease of access to necessary information. Many systems additionally include recorded maintenance information specific to the exact system being examined. This allows technicians immediate access to necessary information without having to leave the work area to view manuals, data records or computer terminals with the desired information.

Aircraft manufacturer aircraft-on-ground (AOG) teams frequently fly all over the world to perform on-site repairs to return customer aircraft back to service. A typical repair to a customer aircraft may involve the removal of hundreds of parts especially in areas of the aircraft where part density is high. At least in the United States, each part removed from the aircraft must be documented and labeled per Federal Aviation Administration (FAA) regulations. Identifying information for each part (part number, part name, aircraft location, etc.) can be difficult and time consuming. This excessive time spent researching part information can increase overall repair times and lead to additional repair costs.

Quality issues are frequently identified during the aircraft production build cycle. The first step in resolving the issue is to accurately document the issue, which often includes identifying facts such the parts involved, the location in the aircraft coordinate system and installation authority. Just finding part numbers and relaying that information to others is a difficult and time consuming task. For example, once a part is installed, the identification tag on the part is frequently hidden from sight so that the only way to find the part number is to start exploring the engineering documentation. This could require spending hours to find and validate the part number that was installed due to the large amount of engineering definition required for a large commercial aircraft. A significant number of the documented issues have incorrect or missing information or are duplications because of the difficulties in accurately collecting the required information. When this happens, the issue reports must be routed back to the initiators for correction. This overall process is time consuming and can result in significant delays during the build cycle when any disruption could result in delayed deliveries.

BRIEF SUMMARY

The present disclosure is generally directed to manufacturing, inspection, maintenance and repair of a structural product and, in particular, to data acquisition and encoding linking physical objects with virtual data for manufacturing, inspection, maintenance and repair. In accordance with example implementations, a user of a digital 3D model viewer may identify a part of a structural product (e.g., aircraft) at a specific 3D location, and then save that information in machine-readable format and perhaps also human-readable format, and record the formatted information on some physical medium to produce a physical label that may be affixed on or proximate the part. A user may later return to that location, read the machine-readable information from the label and bring their computer system to the same state acquired by the initial user who identified the issue. This may save time for repeat visits to the location, since the follow-on users do not need to perform the location and identification steps again. It also reduces the possibility of data transcription errors.

Example implementations of the present disclosure may have benefit in a number of different use cases, includes airplane-on-ground (AOG), emergent removal (ER) and non-conformance (NC). Example implementations may visually associate physical instance(s) of part(s) with their corresponding 3D model(s) using a complete digital 3D model of a structural product for a specific structural product being repaired. Once the part is associated with the model, a link may be provided to authority system(s) along with a method to transfer the part information to other forms (digital data, adhesive-backed labels) and information systems.

The present disclosure thus includes, without limitation, the following example implementations. In some example implementations, a method comprises image rendering for display, a digital three-dimensional (3D) model of a structural product composed of a plurality of parts, the digital 3D model being observed from a home viewpoint; receiving input to navigate the digital 3D model to a part of the plurality of parts, observation of the digital 3D model being moved from the home viewpoint to a navigated viewpoint; generating a digital label that includes information specifying the navigated viewpoint and includes information for the part; and outputting the digital label to a label recorder configured to record the digital label on a physical medium and thereby produce a corresponding physical label, at least the information specifying the navigated viewpoint of the digital 3D model in the digital label and corresponding physical label being in a machine-readable format and capable of being machine-read to automatically restore the digital 3D model at the navigated viewpoint.

In some example implementations of the method of the preceding or any subsequent example implementation, or any combination thereof, the information specifying the navigated viewpoint of the digital 3D model includes look-from, look-direction, up-direction and field-of-view values.

In some example implementations of the method of any preceding or any subsequent example implementation, or any combination thereof, at least the information specifying the navigated viewpoint is in the machine-readable format of an automatic identification and data capture (AIDC) technology, and wherein outputting the digital label includes outputting the digital label to the label recorder compatible with the AIDC technology.

In some example implementations of the method of any preceding or any subsequent example implementation, or any combination thereof, the information for the part includes at least a name and location of the part in the structural product, the name and location being retrievable from the digital 3D model or metadata associated with the digital 3D model.

In some example implementations of the method of any preceding or any subsequent example implementation, or any combination thereof, the method further comprises generating a command string that is transferrable (e.g., copy-pasteable) to a computer program from which the command string is executable to automatically restore the digital 3D model at the navigated viewpoint.

In some example implementations of the method of any preceding or any subsequent example implementation, or any combination thereof, the method further comprises executing a software function including a user interface configured to present or accept information for a manufacturing, inspection, maintenance or repair procedure that involves the part, and includes at least some of the information for the part, and wherein the digital label is generated and output by the software function.

In some example implementations of the method of any preceding or any subsequent example implementation, or any combination thereof, the method further comprises executing, from the software function, an authority system for the structural product from which the digital 3D model or information contained therein is verifiable.

In some example implementations, an apparatus is provided that comprises a processor and a memory storing executable instructions that, in response to execution by the processor, cause the apparatus to at least perform the method of any preceding example implementation, or any combination thereof.

In some example implementations, a computer-readable storage medium is provided. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWINGS

Figure 2A:
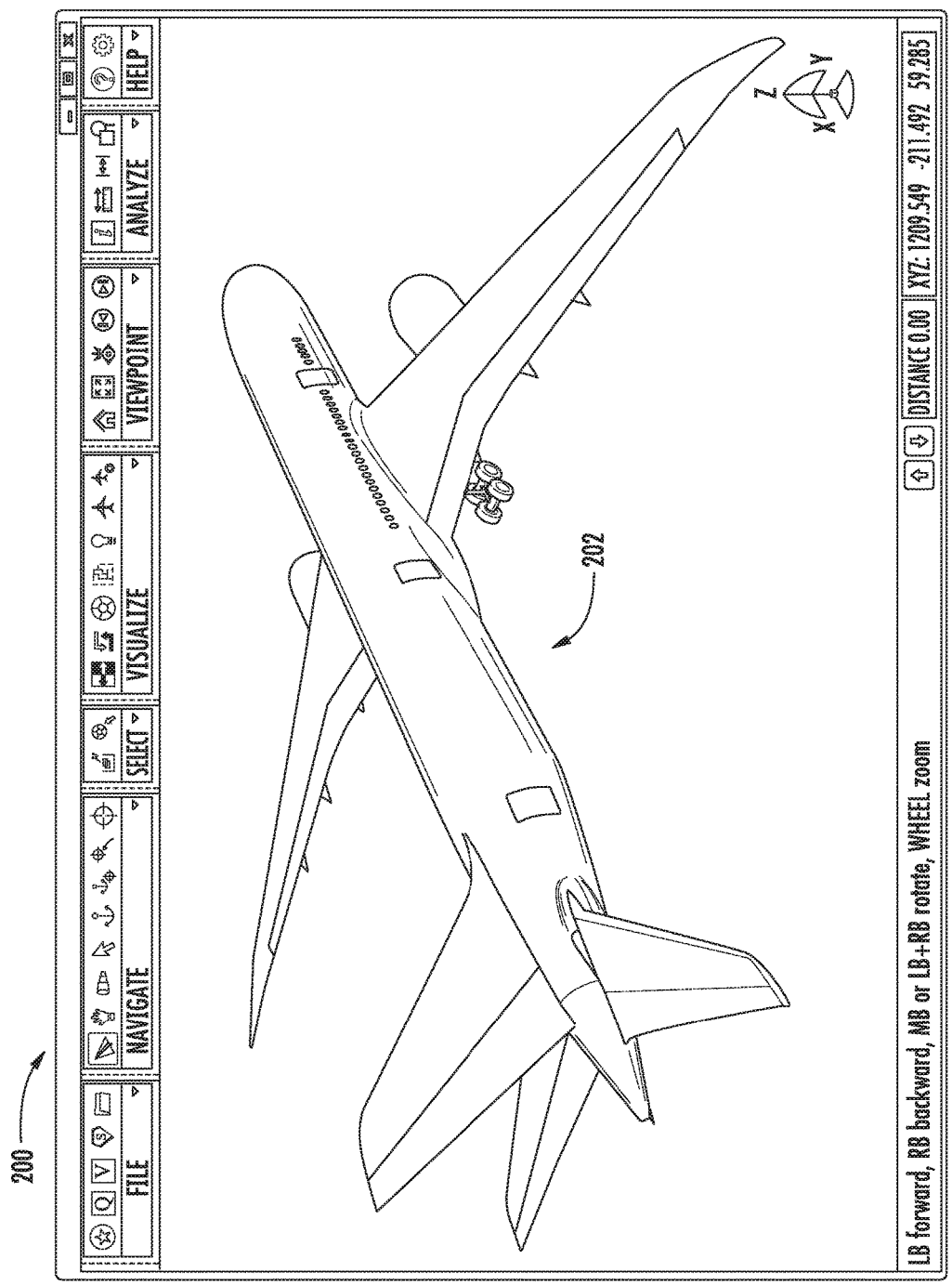
Figures 2B, 3:
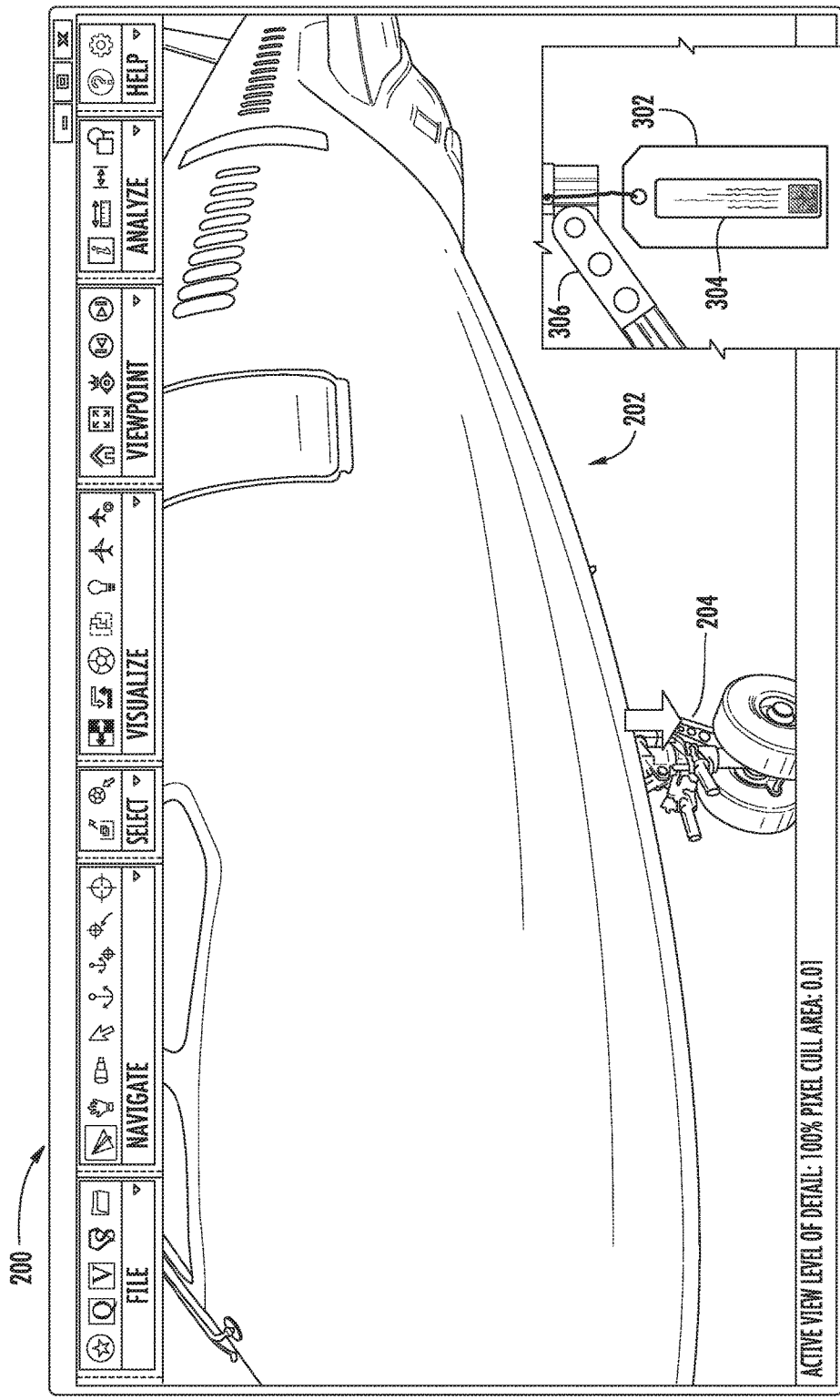
Figure 4A:
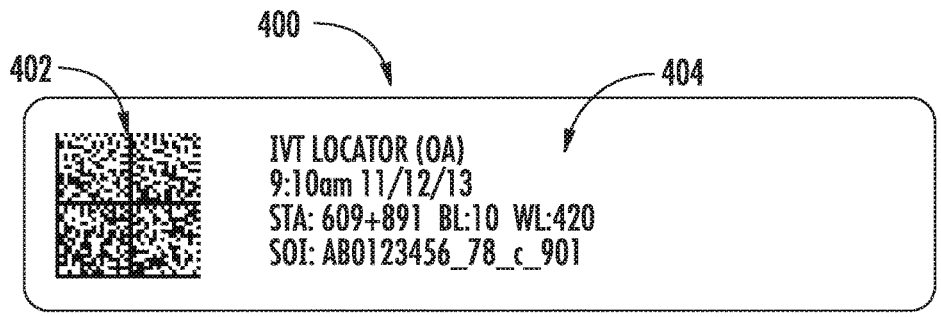
Figure 4B:
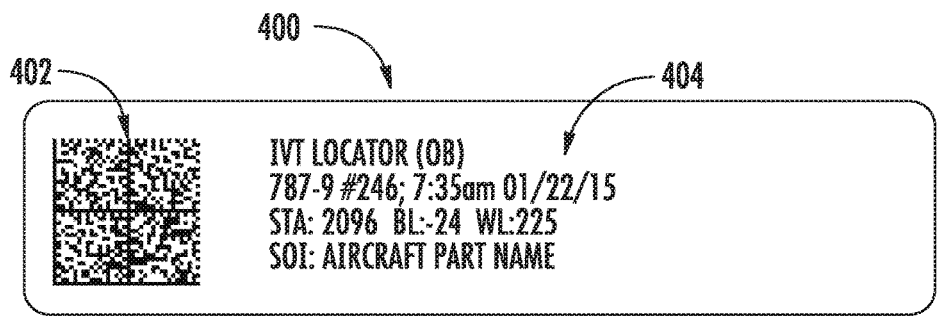
Figure 4C:
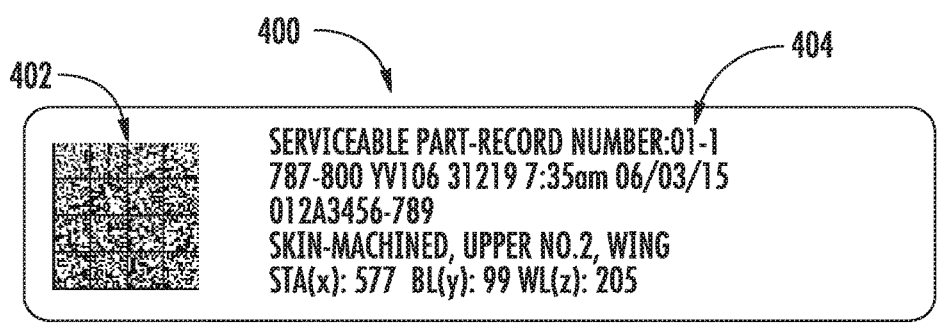
Figure 5:
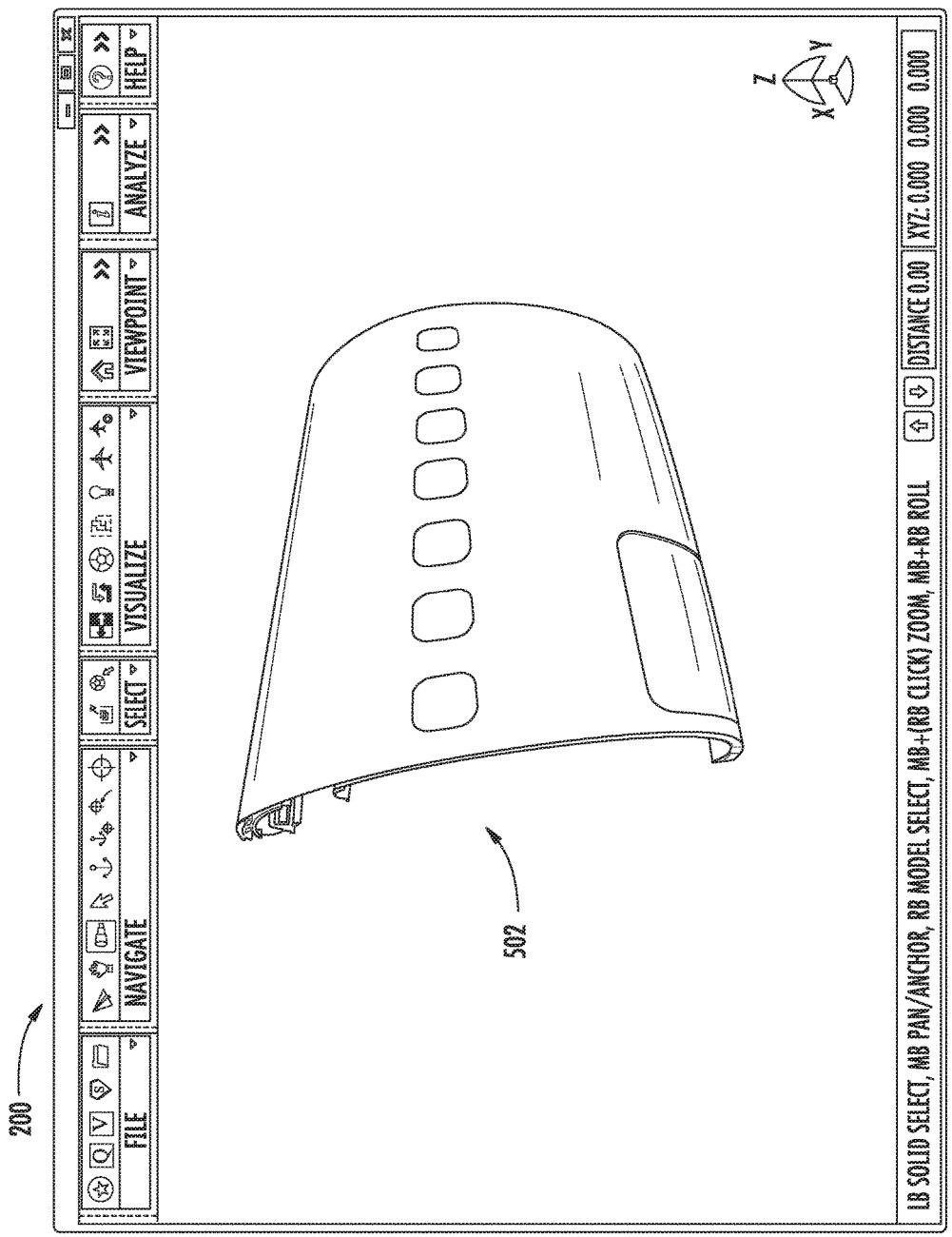
Figure 6:
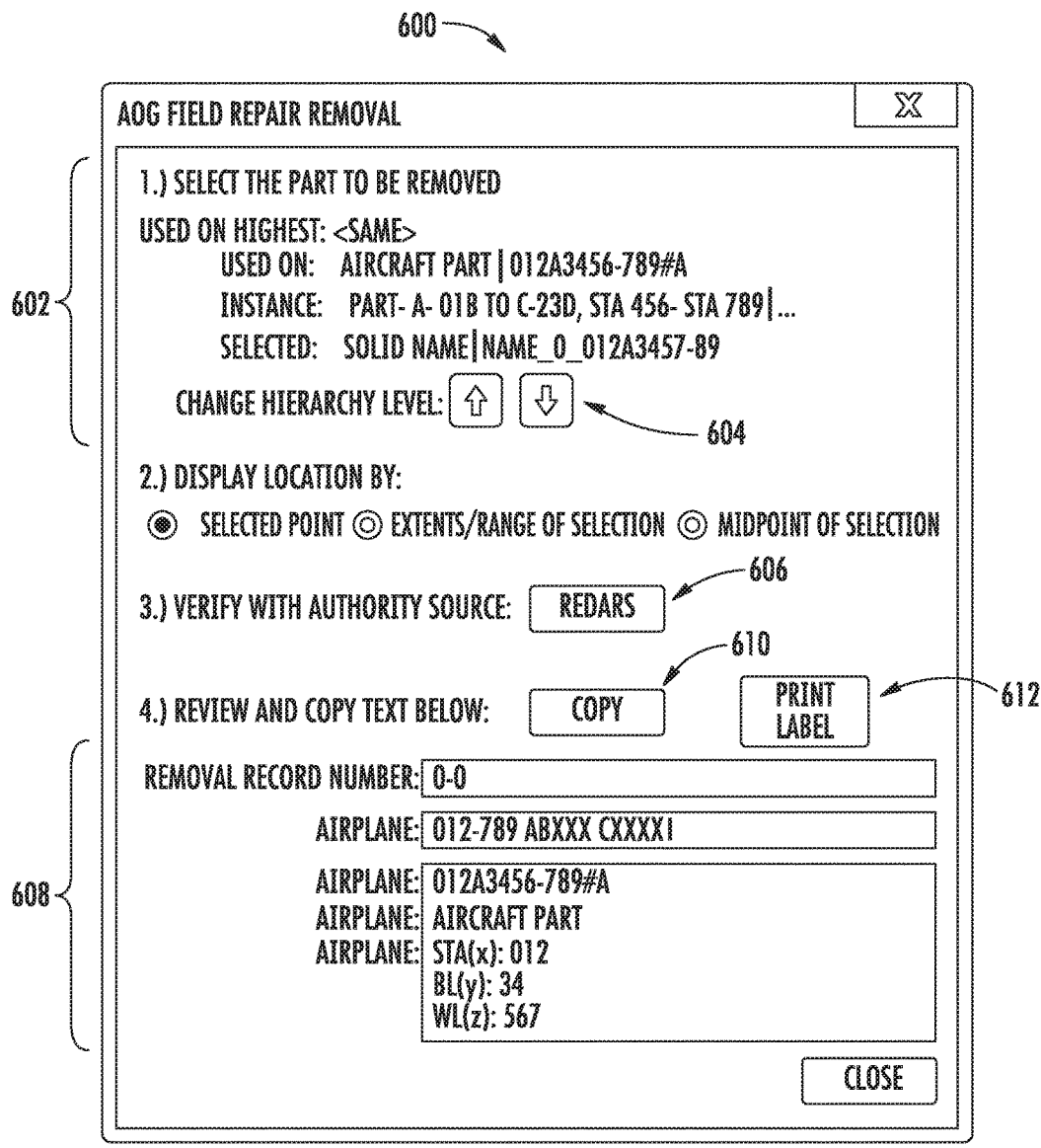
Figure 8:
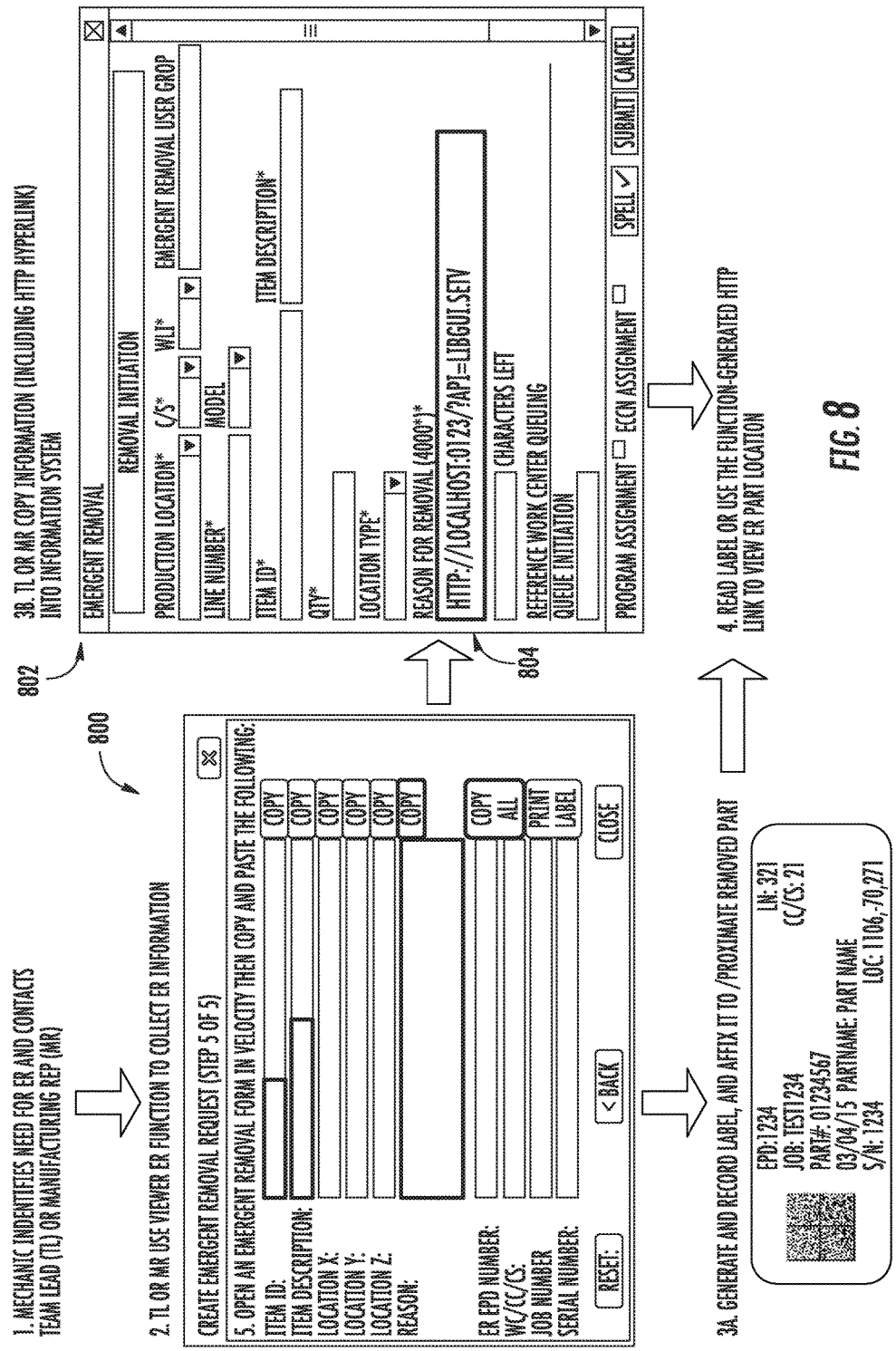
Figure 9A:
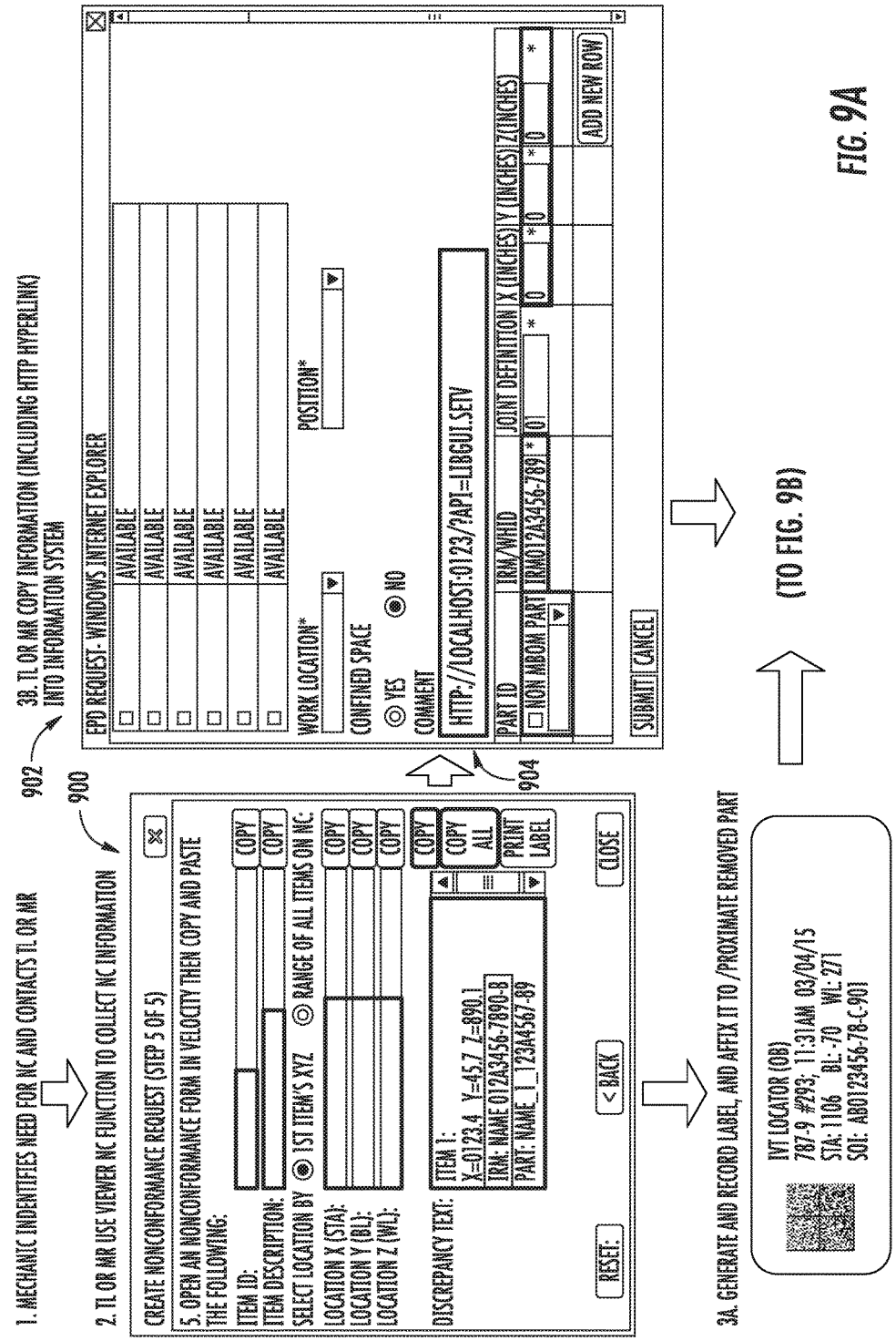
Figure 10:
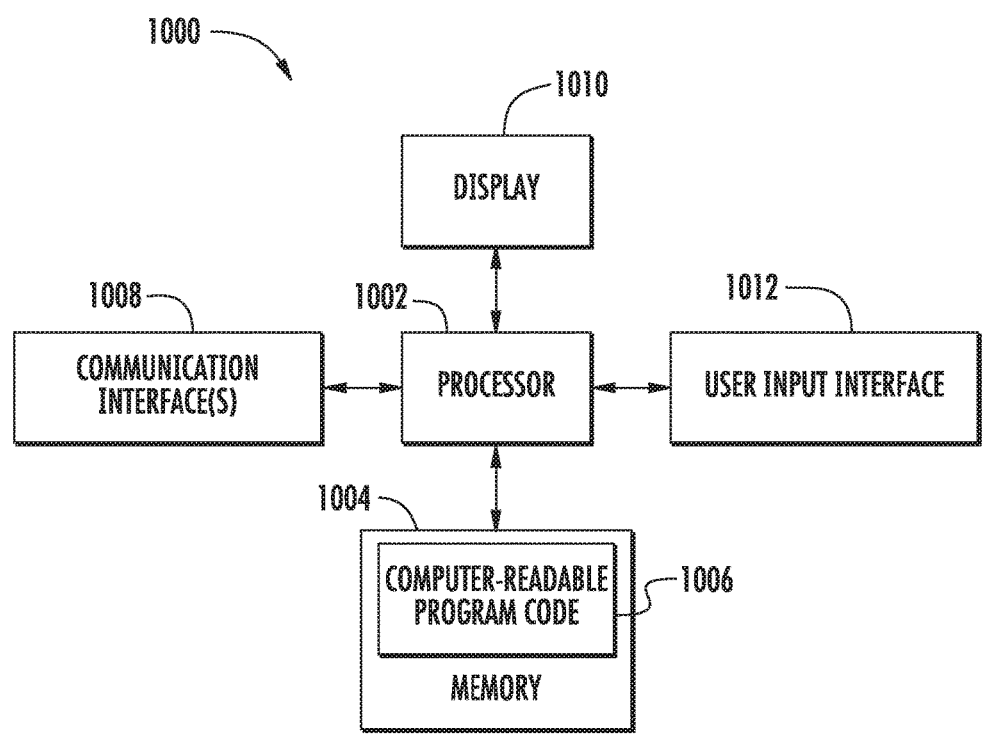

Having thus described example implementations of the disclosure in general terms, reference will now be made to the accompanying drawings, which are not necessarily drawn to scale, and wherein:

FIG. 1 illustrates a system according to example implementations of the present disclosure;

FIGS. 2A and 2B illustrate a three-dimensional (3D) viewer displaying a digital 3D model of an aircraft in respectively home and navigated viewpoints, according to example implementations;

FIG. 3 illustrates a physical label affixed to or proximate a physical instance of a part, according to example implementations;

FIGS. 4A, 4B and 4C illustrate example physical labels according to example implementations;

FIG. 5 illustrates a 3D viewer displaying a 3D model of a part of an aircraft according to example implementations;

FIG. 6 illustrates a repair/removal function user interface according to example implementations;

FIG. 7 illustrates a portion of a digital field repair removal record according to example implementations;

FIGS. 8, 9A and 9B illustrate respectively emergent removal (ER) and non-conformance (NC) use cases of example implementations; and FIG. 10 illustrates an apparatus according to some example implementations.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Furthermore, it should be understood that unless otherwise specified, the terms "data," "content," "information," and similar terms may be at times used interchangeably. Like reference numerals refer to like elements throughout.

Example implementations of the present disclosure relate generally to manufacturing, inspection, maintenance and repair of a structural product and, in particular, to a data acquisition and encoding process linking physical objects with digital information for manufacturing, inspection, maintenance and repair. Example implementations will be primarily described in conjunction with aerospace applications in which the structural product is an aircraft. It should be understood, however, that example implementations may be utilized in conjunction with a variety of other applications, both in the aerospace industry and outside of the aerospace industry. Other examples of suitable structural products include any of a number of different types of vehicles, such as spacecraft, watercraft, motor vehicles, railed vehicles and the like.

Some example implementations of the present disclosure provide a process in which digital information including three-dimensional (3D) location, part identification and/or task specific-information for a part of a structural product (e.g., aircraft) may be extracted from a 3D-enabled application program. This extracted information may be formatted as machine-readable information and encoded onto a label, and perhaps along with human-readable information, and affixed to or proximate a physical instance of the part at a point of use. The information may then be extracted from the label at a later time and used to return the application program to a known viewpoint and information representation state, or used by another application program to store or transmit the information.

In some contexts, example implementations of the present disclosure allow users to record an issue at a specific location, print it using a portable label printer, and the apply the label to the exact point-of-use. The same or another user may later return to that location, scan or otherwise machine-read the machine-readable label, and bring their 3D-enabled application program to the same state as the initial user who identified the issue. This capability may be useful in a number of different contexts, such as aircraft manufacturing and maintenance, as well as other application programs using location data. This process enables application programs, such as viewers of 3D models of structural products, to be used on-site to capture, record, and receive point-of-use data more efficiently and with fewer mistakes.

Some other example implementations of the present disclosure provide a process that links together physical instances of parts and digital information for use in application programs involving manufacturing, inspection, maintenance and/or repair. This process may assist in documenting part removals and repairs utilizing a 3D model of the structural product including the parts. The process may leverage the ability to display the 3D model of a fully-configured structural product such as a large commercial aircraft to enable rapid navigation through the digital environment to find metadata for any physical instance of a part that needs repair or removal at any level of a hierarchical part list (e.g., detail, assembly, installation). A user interface of a 3D-enabled application program such a viewer of 3D models can be tailored for different use cases to support the collection, review and/or validation of information to document the removal or repair. Validated information may be transferred into other information systems as desired. The information captured may include commands executable via a web browser or other suitable application to quickly restore the viewpoint in the digital scene. And as introduced above, the process may also support the creation of labels encoded with machine-readable information that may be affixed to or proximate a physical instance of the part, and that may be read later to provide quick access to pertinent information and to restore the view in the digital scene.

FIG. 1 illustrates a system 100 according to example implementations of the present disclosure. The system may include any of a number of different subsystems (each an individual system) for performing one or more functions or operations. As shown, for example, the system may include one or more of each of a computer system 102, label recorder 104 and label reader 106. The system as shown includes two computer systems, one of which is coupled to the label recorder, and the other of which is coupled to the label reader. It should be understood, that in some examples, a single computer system may be coupled to both the label recorder and label reader. Moreover, although shown as part of the system, it should be understood that any of the computer system, label recorder or label reader may function or operate as a separate system without regard to the others. It should also be understood that the system may include one or more additional or alternative subsystems than those shown in FIG. 1.

As described in greater detail below, the computer system 102 may be generally configured to execute one or more computer programs, including a three-dimensional (3D) viewer 108 configured to render for display, a digital 3D model 110 of a structural product composed of a plurality of parts, such as a 3D computer-aided design (CAD) or other similar model (sometimes referred to as a solid model). The 3D viewer may render the digital 3D model in accordance with a number of techniques, such as those employed by CAD viewers and other 3D visualization applications. These types of applications use a graphics engine, such as OpenGL or Direct3D, to render sequences of images representing the 3D models contained within a virtual environment. Some examples include virtual reality modeling language (VRML) viewers, X3D viewers, Java 3D viewers, QuickTime virtual reality (VR) or QTVR viewers or the like.

In one example, the 3D model 110 may represent the structural product as a collection of "primitives" such as edges, faces, points (e.g., vertices) and the like, which may be arranged into polygons or other arithmetically-derived structures to represent the geometry of surfaces, volumes or parts of the respective structural product. The structural product may be defined by a "boundary" representation, or collection of polygons that demarcate the space occupied by the structural product, which may include sub-collections of polygons that demarcate spaces occupied by respective parts of the structural product. Each of these sub-collections of polygons may be referred to as a 3D object that corresponds to part of the structural product in the 3D model. For some structural products, the 3D model may use hundreds of thousands, millions or even billions of polygons, which may be arranged in thousands of sub-collections of polygons (3D objects) corresponding to several thousands of parts.

The 3D model 110 may include information that may indicate a design type of the model, such as an art concept, preliminary design, released design or the like. The 3D model may include information (e.g., name, number, quantity, source, material, 3D location, related parts) regarding the structural product and/or one or more of its parts. The 3D model may even further include additional information that in some examples, with the 3D model, may compose a model-based definition (MBD) of the structural product. For example, the 3D model may include product manufacturing information (PMI) such as geometric dimensions and tolerances (GD&T), material specifications, component lists, process specifications, inspection requirements or the like. Additionally or alternatively, for example, the 3D model may include information specifying various manufacturing, inspection, maintenance and/or repair procedures, each of which may include one or more tasks involving (user) interaction with one or more parts of the structural product. In various examples, this additional information may be provided directly in the 3D model, or in metadata associated with the 3D model.

The 3D viewer 108 may be configured to render the digital 3D model 110 of the structural product in a scene in which the digital 3D model is observed from a particular point of view (or viewpoint). The 3D viewer may open or otherwise initially render the 3D model observed from a home viewpoint, such as a viewpoint in which the whole of the structural product is observed. The 3D viewer may then receive input to navigate the digital 3D model through a number of different operations such pan, tilt and/or zoom operations, which may move the viewpoint of the digital 3D model from its home to another viewpoint. In some examples, the input may be user input to navigate the digital 3D model. In other examples, the input may be automated input such as from various types of location tracking, or semi-automated input such as from users assisted with one or more sensors. Regardless of the particular type of input, in this manner, the scene may be focused on a part of the structural product, or more particularly the 3D object corresponding to a part of the structural product. Information regarding the part may also be similarly acquired from the digital 3D model or metadata associated with it. As introduced above, this information may include, for example, the name and/or number of the part, the 3D location of the part, information specifying procedure(s) involving the part, and the like. As described herein, the 3D location of a part may refer to its 3D coordinate position and rotational orientation.

In accordance with example implementations of the present disclosure, the 3D viewer 108 may be further configured to extract the information that specifies the navigated (e.g., user-navigated) viewpoint of the digital 3D model, as well as information regarding the part on which the rendered scene at that viewpoint is focused (e.g., name, number, 3D location, procedure(s)), and generate a digital label that includes this extracted information. The 3D viewer may then output the digital label to the label recorder 104 configured to record the digital label on some physical medium and thereby produce a corresponding physical label 112 (at times simply referred to as a label) that includes the extracted information. In the digital label and corresponding physical label, at least some of the extracted information may be in a machine-readable format, and perhaps also at least some of the extracted information in a human-readable format (e.g., text).

The particular format of the machine-readable information may differ depending on context, but may be according to any of a number of different automatic identification and data capture (AIDC) techniques. Examples of suitable AIDC techniques include barcode (linear or matrix), bokode, radio frequency identification (RFID) (passive, active or battery-assisted passive RFID), magnetic stripes, optical character recognition (OCR), integrated circuit card (ICC) (contact or contactless) and the like. In many of these formats, the machine-readable information is not also human-readable; but for at least OCR, the machine-readable information may be both machine-readable and human-readable.

The label recorder 104 and manner in which the label 112 is configured to produce the label may likewise differ depending on the format of the machine-readable information. As explained in greater detail below, in some examples, the label recorder may be a label printer configured to print a barcode or OCR-interpretable text, and any human-readable information, onto a label such as an adhesive-backed label. In other examples, the label recorder may be a RFID writer configured to write an RFID tag affixed to a label, a magnetic strip encoder configured to encode a magnetic strip affixed to a label, or an ICC encoder configured to encode an embedded integrated circuit of an ICC affixed to or that may form a label.

Regardless of the particular format of the machine-readable information, the label 112 including the machine-readable information and any human-readable information may be affixed to or proximate a physical instance of the part to which the information pertains. The label may be affixed in any of a number of different manners depending on the type of label. For example, an adhesive-backed label may be adhered directly to the part, or to a hangtag that may be affixed to or proximate the part. The label may then be carried by the physical instance of the part for later retrieval of information from the label, such as at some point of use of the structural product including the part to/proximate which the label is affixed, which may involve the label reader 106.

The label reader 106 may be configured to interface with a computer system 102, or more particularly a software application, such as a 3D viewer 108 of the computer system, to read and interpret the machine-readable information from the label 112. The label reader may employ AIDC technology similar to that employed by the label recorder 104 to produce the label, which again, may differ depending on the format of the machine-readable information. For example, the label reader may be a barcode reader configured to read a barcode from a printed label, or a camera configured to record an image of OCR-interpretable text from a printed label. In other examples, the label reader may be a RFID reader configured to read an RFID tag affixed to a label, a magnetic strip reader configured to read a magnetic strip affixed to a label, or an ICC reader configured to read an embedded integrated circuit of an ICC affixed to or that may form a label.

The 3D viewer 108 and computer system 102 may be the same or different from that which generated the digital label, and interfaced with the label recorder 104 to produce the corresponding physical label 112. In some examples, the 3D viewer may be different but of the same type as that involved in generation of the digital label, and configured to render the digital 3D model 110 of the structural product including the part to which the information pertains. The machine-readable information read from the physical label may include a navigated viewpoint of the digital 3D model, and the 3D viewer may automatically render the digital 3D model observed from the navigated viewpoint. The machine-readable information may also include information for the part including, for example, the part's name, number and/or 3D location, and/or procedure(s) involving the part, which the 3D viewer may be configured to automatically display.

In addition to or in lieu of the 3D viewer 108, in some examples, the label reader 106 may be configured to interface with one or more other computer programs 114 executable by the computer system 102 to read and interpret the machine-readable information from the label 112. In some examples, the other program(s) may provide respective software-based systems such as information systems, computer-aided design (CAD) systems, manufacturing execution systems (MESs), building management systems, and the like. Examples of suitable information systems may include authority systems such as Reference Engineering Data Automated Retrieval System (REDARS). Other examples of suitable information systems may include transaction processing systems, office systems, decision support systems, knowledge management systems, database management systems, office information systems. Yet other examples of suitable information systems may include data warehouses, resource planning systems, enterprise systems, expert systems, search engines, geographic information systems, global information systems, office automation systems and the like.

In some examples, the information read from the label 112 may be compressed or encoded. In these examples, the 3D viewer 108 or label recorder 104 may be configured to perform the compression/encoding, and the label reader 106 or 3D viewer 108 may be configured to perform the decompression/decoding. But encoding as formatted clear text, as described above, may allow users with general-purpose devices with integrated cameras and scanning applications (like those commonly available on smartphones) to capture the label information as text and paste or otherwise transfer that into a document or email. The data may also be stored in an encrypted format on the label that can be decrypted using an encryption key on the receiving computer system 102.

In some examples, color elements can be added to the label 112 to help differentiate labels, such as to allow the 3D viewer 108 to respond differently to different colors. In some examples in which the machine-readable information is printed, the machine-readable information may be printed using an ink that is only revealed by ultraviolet (UV) light.

By encoding the viewpoint into the label 112, the 3D viewer 118 does not require a separate location tracking process to determine the appropriate viewpoint from which to render the 3D model. This label-based approach also eliminates the need for repeated searching and identifying parts and/or procedure information. The part name, number, 3D location and/or procedure information on the label may be available for subsequent users to quickly scan (machine-read) and jump right to the part and automatically populate other application data fields. This may also reduce if not eliminate some of the main bottlenecks in inspection and repair procedures.

To further illustrate example implementations of the present disclosure, FIGS. 2A and 2B illustrate a 3D viewer 200 and digital 3D model 202 of an aircraft (structural product) that are suitable examples of respectively the 3D viewer 108 and digital 3D model 110 of FIG. 1. As shown in FIG. 2A, the 3D viewer may open or otherwise initially render the 3D model observed from a home viewpoint, such as a viewpoint in which the whole of the aircraft is observed. As shown in FIG. 2B, through navigation, the viewpoint of the 3D model may move to focus the scene on the 3D object 204 for a part of the aircraft, highlighted by the arrow above the wheel in FIG. 2B. In reference to FIG. 1, the 3D viewer may extract information that specifies the navigated viewpoint, as well as information regarding the part, generate a digital label that includes this extracted information, and interface with the label recorder 104 to record the digital label on some physical medium and thereby produce a corresponding physical label 112. The physical label may then be affixed to or proximate a physical instance of the part. FIG. 3 illustrates an example of a physical label 302 adhered to a hangtag 304 that may be affixed to a physical instance 306 of the part to which the scene shown in FIG. 2B is focused.

To further illustrate examples of suitable physical labels 112 that may be produced in accordance with example implementations of the present disclosure, reference is now made to FIGS. 4A, 4B and 4C each of which illustrates a label 400. As shown, each of the example labels includes a matrix barcode 402 (as shown, for example, a Data Matrix code) and human-readable text 404. In the illustrated examples, the encoded data of the matrix barcode is stored in a comma separated value (CSV) form, with a leading tag format that can then be interpreted by the 3D viewer 108 coupled to the label reader 106. Other formats may also be suitable, including markup language formats such as extensible markup language (XML) that have defined field tags for each item. Approaches using a tag-for-each-item method may be suitable for general usage cases, but when physical space on the label is limited, a more compact data encoding format may be more practical. The information readable from the labels 400 shown in FIGS. 4A, 4B and 4C may be as follows:

FIG. 4A: A, 787, 9, 200, AB0123456_78_c_901, 1401+96, 210, 199, 609+891, 10, 420, 0, 0, 1, 45

FIG. 4B: 0B, 787, 9, 246, Aircraft Part Name, 2096, −24, 225, 2316, −11, 234, 2312, −3, 239, 3, −4, 8, 60

FIG. 4C: 0D, 787, 10, 12345678, 0, 1440+1020, −1089, 245, 1401+116, −188, 242, 1440+1020, −656, 340, −19, 25, 95, 50, Serviceable Part—Record Number: 01-1, 737-800 YV106 31219 7:35 AM 06/03/2015, 012A3456-789, SKIN-MACHINED'UPPER NO. 2'WING, STA(x): 577 BL(y):99 WL(z):205

Once read by the label reader 106, the 3D viewer 108 may interpret the initial tag (e.g., the leading characters 0A, 0B, 0D in the above examples) to order to identify the format to use for extraction of the CSV data into appropriate internal variables. For example, information may specify the viewpoint, including plug coordinates in ten fields: three look-from values, three look-direction values, three up-direction values and a field-of-view value. In the example of FIG. 4A that uses the 0A identification tag, the viewpoint may be stored in fields 6 through 15 (1401+96, 210, 199, 609+891, 10, 420, 0, 0, 1, 45). Other application-specific information that can be automatically interpreted by the 3D viewer with access to the tag formats, can also be included on the label.

As will be appreciated, example implementations of the present disclosure may have a number of different uses, and may be used to link physical objects such as structural product parts with digital information, such as part names, numbers, 3D location, procedure(s) and other appropriate manufacturing, inspection, maintenance and repair information. Example implementations may leverage visualization of a digital 3D model 110 of a structural product on a portable computer or other computer system 102, through which a physical instance of a structural product may be interrogated. The digital 3D model may be manipulated to coincide with a user's view of the physical instance such that information associated with a physical instance of a part may be retrieved without knowing any more about that part than its location on the structural product. With the complete information of a part and its assembly available, a concise physical label 112 may be produced and affixed to a physical instance of the part as a desired piece of the documentation used during a procedure such as repair or removal. Customizable per use case, the label may contain pertinent machine-readable information and perhaps also human-readable information to help reestablish future digital visualization sessions.

Example implementations may have applicability in a number of different use cases, including manufacturing, inspection, maintenance and/or repair of a structural product such as an aircraft. Examples of suitable use cases include airplane-on-ground (AOG), emergent removal (ER) and non-conformance (NC). Other suitable examples include customer pickup, in-work assembly/disassembly and the like. FIGS. 5, 6 and 7, along with again FIG. 2A, illustrate various aspects in an example AOG use case, and which may similarly have applicability to other use cases according to example implementations of the present disclosure. Leading into this example use case, a user (e.g., mechanic, inspector, quality assurance (QA)) working on a physical instance of a structural product (e.g., aircraft) may identify an issue with a part on the structural product, which may require documentation before work can continue.

As shown in FIGS. 2A and 2B, the user may operate a computer system 102 located on or proximate the structural product to execute a 3D viewer 200 (e.g., 3D viewer 108), open a digital 3D model 202 (e.g., digital 3D model 110) of the structural product being worked on, and navigate the digital 3D model to locate the part at issue. FIG. 5 illustrates the 3D object 502 for a part at issue, with the remaining 3D objects of the digital 3D model being hidden from view. The user may start a part repair/removal function from the 3D viewer 200, which may include a user interface (UI) 600 (the UI at times simply referred to as the repair/removal function), as shown in FIG. 6. In some examples, the repair/removal function and its UI may be tailored to a particular use case (e.g., part removal on an in-service airplane, or non-conformance in final assembly).

The user may select the 3D object of the part at issue from the digital 3D model 202, which may cause the repair/removal function 600 to display at 602, the 3D object's location in the structural product's coordinate system, and in a hierarchical part list including the part at issue. The user may navigate the hierarchical part list to an appropriate level (detail, assembly, installation), such as using up/down UI controls 604.

The user may validate that information shown in the digital 3D model 202 is accurate in one or more engineering drawings or other technical documentation, such as may be provided by one or more authority systems (e.g., REDARS). As shown in FIG. 6, this may be accomplished using link(s) or UI control(s) 606 from the repair/removal function 600, which may cause display of the part of interest in the authority system(s). The user may also validate the repair/removal is not already documented in an appropriate MES using link(s) from the repair/removal function that automatically display information dynamically retrieved from the authority system showing the part and plans (shop order instance (SOI)) of interest.

The repair/removal function 600 may extract, organize and prepare for output at 608, information for the part of interest. The user also may enter additional information in the repair/removal function UI such as a description of the issue, current work location or work instruction identifier. The repair/removal function may thereby collect information in a single place before entering the information to an authoritative authoring system.

The repair/removal function 600 may include an appropriate UI control 610 to allow the user to copy information from the repair/removal function, which may then be transferred (e.g., pasted) into other appropriate systems as desired or required to complete the repair/removal documentation. As shown in FIG. 7, for example, this may include an appropriate digital field repair removal record 700 including a field 702 in which the information may be transferred. The repair/removal function may also generate a hypertext transfer protocol (HTTP) command string that can be transferred into a uniform resource locator (URL) of a web browser, which can then be decoded and used by the 3D viewer 200 to automatically restore the navigated viewpoint of the digital 3D model at a later time, which may facilitate communication of the issue to multiple people required to resolve the issue.

The command string may be transferred in any of a number of different manners. In some examples, the command string may be cut-pasteable. In other examples, on selection of the command string, its HTTP format may be automatically detected, and a suitable HTTP call executed, to thereby transfer the command string.

In addition, the repair/removal function 600 may include an appropriate UI control 612 to allow the user to cause the computer system 102 to generate a digital label, and interface with the label recorder 104 to produce a corresponding physical label (e.g., label 112, 400) with machine-readable information and human-readable information. In some examples, multiple copies of the label may be generated to facilitate communication of the issue to multiple people. The physical label may be affixed to the physical instance of the part, and the part may be removed from the structural product and stored for repair.

At some later time when the part is repaired and ready to be reinstalled on the structural product, a user (e.g., mechanic) may operate a computer system 102 to execute a 3D viewer 200 and open the digital 3D model 202 similar to before. The user may operate the label reader 106 to read the machine-readable information from the label affixed to or proximate the part.

The 3D viewer 200 may interpret the machine-readable information and automatically, render the 3D model at the restored navigated viewpoint, select and highlight the 3D object for the part on the 3D model, and/or overlay some indicator over the selected 3D object for the part to clearly identify it on the 3D model. The user may interpret the 3D model at the restored navigated viewpoint, and with the selected and overlaid 3D object for the part to identify exactly where to install the part on a physical instance of the structural product.

As indicated above, example implementations may have applicability in a number of different use cases, including AOG, ER and NC. For information regarding similar examples for ER and NC use cases, including their own respectively tailored repair/removal functions, see FIGS. 8, 9A and 9B. Each of these use cases may be carried out similar to that described above for AOG, including through navigation of the digital 3D model 202 (e.g., digital 3D model 110) of the structural product being worked on to locate the part at issue, as shown and described above with respect to FIGS. 2A, 2B and 5. Whereas the AOG use case may involve use of a part repair/removal function (see FIG. 6), the ER and NC use cases may have their own particular functions. As shown in FIG. 8, the ER use case may involve use of a function for part removal on an in-service airplane, which may include a particular UI 800. Similarly, as shown in FIG. 9A the NC use case may involve a function for non-conformance in final assembly, which may include another particular UI 900.

The functions 800, 900 for the ER and NC use cases may also include respective controls to allow the user to copy information from the functions for transferring (e.g., pasting) into other appropriate systems to complete their respective functions. In the AOG case, this may include the digital field repair removal record 700, as shown and described above with respect to FIG. 7. As shown in FIG. 8, in the ER case, information may be copied and transferred into an appropriate information system 802. As shown in FIG. 9A, in the NC case, information may be copied and transferred into an appropriate digital emergent process document (EPD) call sheet 902. As also shown in FIGS. 8 and 9A, the functions may also generate HTTP command strings 804, 904, which may also be transferred into the appropriate system and used by the 3D viewer 200 to automatically restore the navigated viewpoint of the digital 3D model at a later time.

In addition, in the ER and NC use cases, the respective functions 800, 900 may include UI controls to allow the user to cause the computer system 102 to generate a digital label, and interface with the label recorder 104 to produce a corresponding physical label (e.g., label 112, 400) with machine-readable information and human-readable information. The process in these use cases may then proceed in a manner similar to that described above for the AOG case. In some examples, multiple copies of the label may be generated to facilitate communication of the issue to multiple people. The physical label may be affixed to the physical instance of the part, and the part may be removed from the structural product and stored for repair. Additionally, as shown in FIG. 9B for the NC use case, the user may validate the non-conformance and collect data into an appropriate information system to create a non-conformance tag for the structural product.

Example implementations of the present disclosure may enable users of 3D viewers to create a link between physical and virtual environments, as well as a link between data systems. Example implementations may be useful in a number of applications, both in the aerospace industry and outside of the aerospace industry. Even further, example implementations may be useful in conjunction with consumer-level applications that involve a physical object with a particular 2D or 3D location, a 3D visualization application, and object data. Examples of suitable consumer-level applications include those that involve integration of the physical with the virtual, such as those involving the Internet of Things (IoT), 3D printing and the like. Example implementations may provide an easy to use pathway for machine-to-machine communication that these and other suitable applications could leverage.

One particular example of a consumer-level application involves video games that use physical locations and 3D graphics. Navigation data and location specific-information that is stored in a compact, inexpensive, machine-readable form may provide a solution for tracking and data exchange that is easy to create and use. Example implementations may also be appropriate for shoppers in large stores or warehouses, particularly in instances in which 3D models of the buildings are made available. Museum virtual tours and theme park interactive "experiences" with some interactive types of scanning capabilities could be extended with location and session specific data to control a corresponding 3D virtual environment, according to example implementations of the present disclosure.

According to example implementations of the present disclosure, computer system 102 may be implemented by various means. Means for implementing the computer system may include hardware alone, or hardware under direction of one or more computer programs from a computer-readable storage medium. In some examples, one or more apparatuses may be configured to function as or otherwise implement the computer system. In examples involving more than one apparatus, the respective apparatuses may be connected to or otherwise in communication with one another in a number of different manners, such as directly or indirectly via a wired or wireless network or the like.

FIG. 10 illustrates an apparatus 1000 that may implement the computer system 102, according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, smart watch, head-mounted display or other wearable displays, server computer, or the like. The apparatus may include one or more of each of a number of components such as, for example, a processor 1002 (e.g., processor unit) connected to a memory 1004 (e.g., storage device).

The processor 1002 is generally any piece of computer hardware that is capable of processing information such as, for example, data, computer programs (e.g., 3D viewer 108, other computer program(s) 114), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1004 (of the same or another apparatus).

The processor 1002 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processor 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more input/output (I/O) interfaces 1012 (e.g., input/output unit). The display may be configured to present or otherwise display information to a user, suitable examples of which include a liquid crystal display (LCD), light-emitting diode display (LED), plasma display panel (PDP) or the like. The I/O interfaces may be wired or wireless, and may be configured to receive information from a user into the apparatus, such as for processing, storage and/or display. Suitable examples of I/O interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1000 may include a processor 1002 and a computer-readable storage medium or memory 1004 coupled to the processor, where the processor is configured to execute computer-readable program code 1006 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least:
   render for display, a digital three-dimensional (3D) model of a structural product composed of a plurality of parts, the digital 3D model being observed from a home viewpoint;
   receive input to navigate the digital 3D model to a part of the plurality of parts, observation of the digital 3D model being moved from the home viewpoint to a navigated viewpoint;
   generate a digital label that includes information specifying the navigated viewpoint and includes information for the part, wherein the information for the part includes at least a name and 3D location of the part on the structural product, the name and 3D location being retrievable from the digital 3D model or metadata associated with the digital 3D model, and wherein the 3D location of the part on the structural product includes a 3D coordinate position and rotational orientation of the part on the structural product; and
   output the digital label to a label recorder configured to record the digital label on a physical medium and thereby produce a corresponding physical label, at least the navigated viewpoint of the digital 3D model in the digital label and corresponding physical label being in a machine-readable format and capable of being machine-read to automatically restore the digital 3D model at the navigated viewpoint.

2. The apparatus of claim 1, wherein the information specifying the navigated viewpoint of the digital 3D model includes look-from, look-direction, up-direction and field-of-view values.

3. The apparatus of claim 1, wherein at least the information specifying the navigated viewpoint is in the machine-readable format of an automatic identification and data capture (AIDC) technology, and
   wherein the apparatus being caused to output the digital label includes being caused to output the digital label to the label recorder compatible with the AIDC technology.

4. The apparatus of claim 1, wherein the memory stores further executable instructions that in response to execution by the processor cause the apparatus to further at least:
   generate a command string that is transferrable to a computer program from which the command string is executable to automatically restore the digital 3D model at the navigated viewpoint.

5. The apparatus of claim 1, wherein the memory stores further executable instructions that in response to execution by the processor cause the apparatus to further at least:

execute a software function including a user interface configured to present or accept information for a manufacturing, inspection, maintenance or repair procedure that involves the part, and includes at least some of the information for the part, and wherein the digital label is generated and output by the software function.

6. The apparatus of claim 5, wherein the memory stores further executable instructions that in response to execution by the processor cause the apparatus to further at least:

execute, from the software function, an authority system for the structural product from which the digital 3D model or information contained therein is verifiable.

7. A method comprising:

rendering for display, a digital three-dimensional (3D) model of a structural product composed of a plurality of parts, the digital 3D model being observed from a home viewpoint;

receiving input to navigate the digital 3D model to a part of the plurality of parts, observation of the digital 3D model being moved from the home viewpoint to a navigated viewpoint;

generating a digital label that includes information specifying the navigated viewpoint and includes information for the part, wherein the information for the part includes at least a name and 3D location of the part on the structural product, the name and 3D location being retrievable from the digital 3D model or metadata associated with the digital 3D model, wherein the 3D location of the part on the structural product includes a 3D coordinate position and rotational orientation of the part on the structural product; and outputting the digital label to a label recorder configured to record the digital label on a physical medium and thereby produce a corresponding physical label, at least the information specifying the navigated viewpoint of the digital 3D model in the digital label and corresponding physical label being in a machine-readable format and capable of being machine-read to automatically restore the digital 3D model at the navigated viewpoint.

8. The method of claim 7, wherein the information specifying the navigated viewpoint of the digital 3D model includes look-from, look-direction, up-direction and field-of-view values.

9. The method of claim 7, wherein at least the information specifying the navigated viewpoint is in the machine-readable format of an automatic identification and data capture (AIDC) technology, and wherein outputting the digital label includes outputting the digital label to the label recorder compatible with the AIDC technology.

10. The method of claim 7 further comprising:

generating a command string that is transferrable to a computer program from which the command string is executable to automatically restore the digital 3D model at the navigated viewpoint.

11. The method of claim 7 further comprising:

executing a software function including a user interface configured to present or accept information for a manufacturing, inspection, maintenance or repair procedure that involves the part, and includes at least some of the information for the part, and wherein the digital label is generated and output by the software function.

12. The method of claim 11 further comprising:

executing, from the software function, an authority system for the structural product from which the digital 3D model or information contained therein is verifiable.

13. A computer-readable storage medium that is non-transitory and has computer-readable program code portions stored therein that, in response to execution by a processor, cause an apparatus to at least:

render for display, a digital three-dimensional (3D) model of a structural product composed of a plurality of parts, the digital 3D model being observed from a home viewpoint;

receive input to navigate the digital 3D model to a part of the plurality of parts, observation of the digital 3D model being moved from the home viewpoint to a navigated viewpoint;

generate a digital label that includes information specifying the navigated viewpoint and includes information for the part, wherein the information for the part includes at least a name and 3D location of the part on the structural product, the name and 3D location being retrievable from the digital 3D model or metadata associated with the digital 3D model, and wherein the 3D location of the part on the structural product includes a 3D coordinate position and rotational orientation of the part on the structural product; and output the digital label to a label recorder configured to record the digital label on a physical medium and thereby produce a corresponding physical label, at least the navigated viewpoint of the digital 3D model in the digital label and corresponding physical label being in a machine-readable format and capable of being machine-read to automatically restore the digital 3D model at the navigated viewpoint.

14. The computer-readable storage medium of claim 13, wherein the information specifying the navigated viewpoint of the digital 3D model includes look-from, look-direction, up-direction and field-of-view values.

15. The computer-readable storage medium of claim 13, wherein at least the information specifying the navigated viewpoint is in the machine-readable format of an automatic identification and data capture (AIDC) technology, and wherein the apparatus being caused to output the digital label includes being caused to output the digital label to the label recorder compatible with the AIDC technology.

16. The computer-readable storage medium of claim 13 having further computer-readable program code portions stored therein that, in response to execution by the processor, cause the apparatus to further at least:

generate a command string that is transferrable to a computer program from which the command string is executable to automatically restore the digital 3D model at the navigated viewpoint.

17. The computer-readable storage medium of claim 13 having further computer-readable program code portions stored therein that, in response to execution by the processor, cause the apparatus to further at least:

execute a software function including a user interface configured to present or accept information for a manufacturing, inspection, maintenance or repair procedure that involves the part, and includes at least some of the information for the part, and wherein the digital label is generated and output by the software function.

18. The computer-readable storage medium of claim 17 having further computer-readable program code portions stored therein that, in response to execution by the processor, cause the apparatus to further at least:
    execute, from the software function, an authority system for the structural product from which the digital 3D model or information contained therein is verifiable.

* * * * *

UNITED STATES PATENT AND TRADEMARK OFFICE
CERTIFICATE OF CORRECTION

PATENT NO. : 10,289,263 B2  
APPLICATION NO. : 15/178922  
DATED : May 14, 2019  
INVENTOR(S) : James J. Troy et al.

Page 1 of 1

It is certified that error appears in the above-identified patent and that said Letters Patent is hereby corrected as shown below:

On the Title Page

Item (72), ninth inventor's Name:
Change "William J. McGarry" to -- William D. McGarry --.

Signed and Sealed this  
Eighth Day of October, 2019

Andrei Iancu  
*Director of the United States Patent and Trademark Office*